US007407360B2

(12) United States Patent
Théberge et al.

(10) Patent No.: US 7,407,360 B2
(45) Date of Patent: Aug. 5, 2008

(54) CONTAINER HANDLING APPARATUS

(75) Inventors: Jocelyn Théberge, Shipshaw (CA); Serge Desgagné, Saint-Honoré (CA)

(73) Assignee: Mecfor Inc., Quebec (CA)

( * ) Notice: Subject to any disclaimer, the term of this patent is extended or adjusted under 35 U.S.C. 154(b) by 472 days.

(21) Appl. No.: 11/066,100

(22) Filed: Feb. 28, 2005

(65) Prior Publication Data

US 2006/0193718 A1 Aug. 31, 2006

(51) Int. Cl.
*B65G 65/34* (2006.01)

(52) U.S. Cl. ........................................ 414/420

(58) Field of Classification Search ................ 414/619, 414/621, 420, 424

See application file for complete search history.

(56) References Cited

U.S. PATENT DOCUMENTS

| | | | | |
|---|---|---|---|---|
| 1,855,862 A * | 4/1932 | McCann et al. | 414/420 |
| 2,971,662 A * | 2/1961 | Dunham | 414/420 |
| 3,127,645 A * | 4/1964 | Dyck | 294/68.27 |
| 3,446,378 A * | 5/1969 | Miller | 414/424 |
| 3,722,720 A * | 3/1973 | Sjostrom et al. | 414/424 |
| 3,897,881 A * | 8/1975 | Brock | 414/424 |
| 3,966,068 A * | 6/1976 | Duvia | 414/424 |
| 4,272,217 A * | 6/1981 | Sefcik | 414/420 |
| 4,687,405 A * | 8/1987 | Olney | 414/408 |
| 4,714,122 A * | 12/1987 | Appleton et al. | 177/139 |
| 4,867,630 A * | 9/1989 | Johnson et al. | 414/409 |
| 5,056,979 A * | 10/1991 | Niederer et al. | 414/408 |
| 5,214,883 A * | 6/1993 | Naumec et al. | 451/328 |
| 5,344,272 A * | 9/1994 | Nuyts | 414/408 |
| 5,466,110 A * | 11/1995 | Redding | 414/421 |
| 5,855,467 A * | 1/1999 | Clonch et al. | 414/680 |
| 5,895,196 A * | 4/1999 | Forsyth | 414/421 |
| 6,486,787 B2 * | 11/2002 | Rieger et al. | 340/685 |

* cited by examiner

*Primary Examiner*—Charles A Fox
(74) *Attorney, Agent, or Firm*—William E. Beaumont

(57) ABSTRACT

An apparatus attached to a lifting device on a transport vehicle for handling a container, the apparatus comprising two arms. At least one arm comprises a first generally C-shaped latch member having a first opening sized to allow a passage of a latching projection therethrough. The at least one arm also comprises a second generally C-shaped latch member rotatably nested inside the first latch member. The second latch member has a second opening sized to allow the passage of the latching projection therethrough and has an inner contact surface shaped to receive the latching projection on the side of the container. The at least one arm also comprises rotating means to selectively rotate each of the second latch members with respect to the first latch member between a capture position, a locking position and a dumping position.

18 Claims, 12 Drawing Sheets

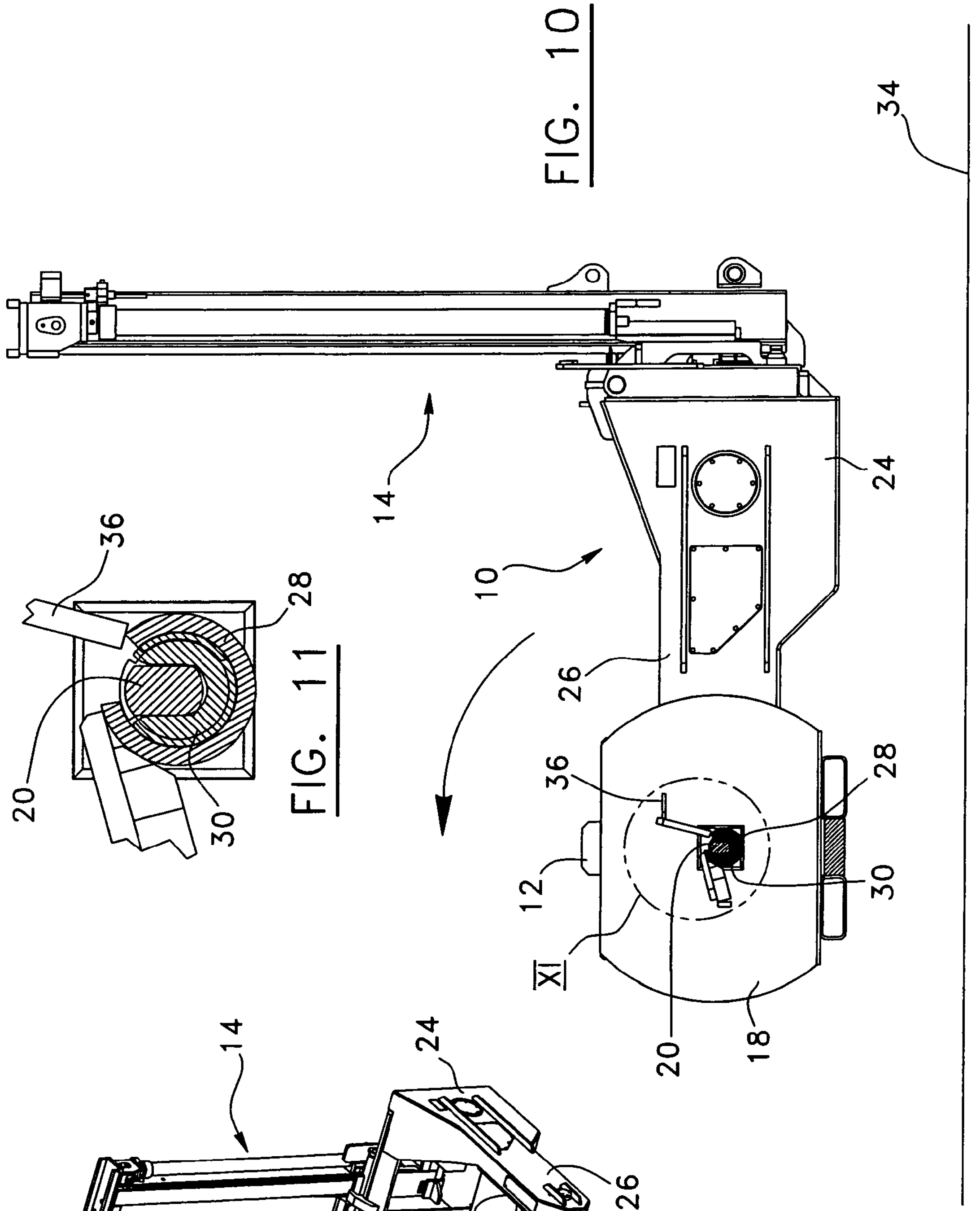
FIG. 10
FIG. 11
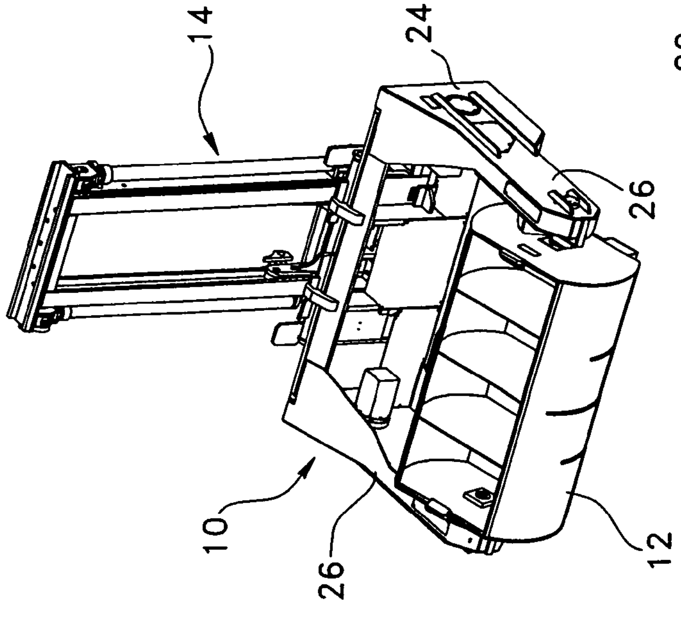
FIG. 12

CONTAINER HANDLING APPARATUS

FIELD OF THE INVENTION

The present invention relates to a container handling apparatus. More particularly, it relates to an apparatus for lifting, transporting and dumping charges, such as silica and scrap boxes or skimming tubs.

BACKGROUND OF THE INVENTION

Aluminum casthouses often have various restrictions in terms of loading space. After the formation of aluminum ingots, scrap elements (billets) are re-introduced into the heating oven to be melted once again. These billets (ingots having a cylindrical shape) are loaded into a container and then dumped into the oven. Similarly, any additives that are added to the oven, including silica or other materials used to create alloys, are manipulated in a similar manner.

A problem with a majority of dumping apparatuses is that these apparatuses have problems dumping their charges into a partly filled oven without splashing or avoiding contact of the container with the molten aluminum surface in the oven.

For the loading and dumping of billets, the prior art apparatuses use either buckets, or containers with bottom doors. The use of buckets usually implies a dumping of loads from a certain height, thus causing splashes when the billets fall into the molten metal. Containers with bottom doors, on the other hand, have two major inconveniences. First of all, very often the bottom door enters in contact with the molten aluminum metal when it opens. Secondly, the container door opening mechanism is often exposed to extremely high temperatures, which reduces its reliability and life span.

Thus, in order to develop a container that does not enter into contact at all with molten aluminum and which reduces exposition of its components to high heat sources, the conventional container principle has to be rethought.

The prior art apparatuses have another important problem: their containers occasionally fall into the ovens. Consequently, a new grappling principle is required to ensure a better quality of the grip of the apparatus onto the container while maintaining in possible shape and global structure of the containers that were initially developed to optimize the capacity, compactness, loading, dumping, stacking capacity and handling of the containers by truck lifts. A mechanism on the container itself must be avoided in order to reduce any exposition of the mechanism to premature wear. Additionally, the apparatus must hold the container solidly at the end of its arms above the oven and make the container turn completely on its own axis without making the container fall into the oven. This rotation must be done with a perfect control of the movement of the container with an offset distance of approximately 6 feet. Modifications to the design were not supposed to influence the attachment mechanism of the apparatus, which must remain removably attached and compatible with a quick attachment system.

Thus, there is still presently a need for an apparatus which can be used to dump tubs or containers.

With such an apparatus, avoidance of any contact of the containers with molten metal surface is desired. Additionally, the apparatus should reduce risks of plunging the container in molten metal. Moreover, the apparatus should be adapted to allow the dumping of metal without causing splashes, nor submerging the container in molten metal, as the container must not enter into contact with the molten metal in the oven.

The apparatus should allow rotation of the container on its own axis, which allows for furnace loading, even if the furnace is full. The apparatus should also be able to dump billets as far away as possible into the oven, by pivoting the container by at least 180°.

Furthermore, the containers should be designed to facilitate loading with conveyors. Additionally, there is a need for an apparatus that insures quick and safe loading of the container. There is also a need for an apparatus, which increases charging capacity of the containers, which can be heavy duty and be stacked to reduce storage space. Consequently, there is a need to develop a container adapted to the loading and dumping of billets in ovens. Such a container should be able to hold up to 2,000 kg of scrap billets, and dump its load without having the container entering contact with the molten aluminum surface. Charges to be lifted and pivoted are typically around 3,000 kg (billets plus container), on a distance around approximately 6 feet. Hence, the containers are designed to be stacked one on top of the other and can be moved from one place to another with a typical power lift truck. Consequently, the containers must have a balanced structure and must be easy to handle. Additionally, the apparatus must be able to stack the containers in a secure manner.

There is also a need for an apparatus that has as many various uses as possible (e.g. being adapted to different formats and shapes of containers—silica buckets, etc.), and be compatible with a quick attached system. Containers being manipulated by the apparatus must also be able to be manipulated by power lift trucks.

The grasping mechanism of the apparatus must be safe and designed in order to avoid dropping containers into the ovens.

Work being accomplished with this apparatus must be done without having the operator exiting the vehicle holding the apparatus. Grasping of containers on the floor must be done without help or signalmen. Grasping of containers must be executed by the operator of the vehicle only.

The dumping means must be designed to take into account the weight of the containers, the center of gravity of the container being rotated, friction of various components and any offset distance between the vehicle and the containers or boxes that have to be displaced or manipulated.

Thus there is still presently a need for an apparatus which meets the above-mentioned requirements.

SUMMARY OF THE INVENTION

An object of the present invention is to provide an apparatus that satisfies the above-mentioned needs.

More particularly, the present invention provides an apparatus having a pivoting mechanism that allows the container to rotate about a central axis, which allows dumping of the contents while avoiding contact between the dumping container and any molten metal surface. The container can be placed directly above the oven and a rotation mechanism is activated, which allows the container to rotate about itself while remaining within a same spatial constraint or restricted volume. Furthermore, the container itself does not comprise any mechanism, which could risk being exposed to harsh environments.

More particularly, the present invention provides an apparatus for handling a container, the apparatus being operably attached to a lifting device on a transport vehicle that lifts and pivots the apparatus with respect to a horizontal plane on which the container rests, the container comprising a pair of opposite sidewalls, said sidewalls each having a latching projection extending outwardly from it, at least one of the latching projections having at least one flat contact surface, wherein said apparatus comprises:

two arms, said arms being spaced apart and adapted to be advanced along and removably connected to the sidewalls of the container, at least one arm being adjacent to the sidewall having said at least one of said latching projections and comprising:

a first generally C-shaped latch member having a first opening sized to allow a passage of said at least one latching projection of the container therethrough;

a second generally C-shaped latch member rotatably nested inside the first latch member, the second latch member having a second opening sized to allow the passage of said at least one latching projection therethrough and having an inner contact surface shaped to receive said at least one latching projection; and rotating means to selectively rotate said second latch member with respect to the corresponding first latch member between:

a first capture position in which the first and second openings of the first and second latch members are aligned to allow an engagement of said at least one latching projection of the container with the second latch member as a result of a lifting of the apparatus; and at least one locking position in which the second latch member is rotated with respect to the first latch member, thereby shifting the first opening away from the second opening to prevent an escape of said at least one latching projection from the second latch member.

Moreover, the invention also provides a method of handling a container with a lifting device on a transport vehicle comprising the steps of:

a) providing the container comprising a pair of opposite sidewalls, said sidewalls each having a latching projection extending outwardly from it, said latching projection having at least one flat contact surface;

b) providing an apparatus operably attached to the lifting device, the apparatus comprising:

two arms, said arms being spaced apart and adapted to be advanced along and removably connected to the sidewalls of the container, at least one arm being adjacent to the sidewall having said at least one of said latching projections and comprising:

a first generally C-shaped latch member having a first opening sized to allow a passage of said at least one latching projection of the container therethrough;

a second generally C-shaped latch member rotatably nested inside the first latch member, said second latch member having a second opening sized to allow the passage of said at least one latching projection therethrough and having an inner contact surface shaped to receive said at least one latching projection; and rotating means to selectively rotate said second latch member with respect to the corresponding first latch member;

c) rotating the second latch member with respect to the first latch member to a first capture position in which the first and second openings of the first and second latch members are aligned;

d) positioning and lifting the apparatus against the container thereby allowing an engagement of said at least one latching projection with the second latch member;

e) lifting the container off a horizontal plane on which the container rests; and f) rotating the second latch member with respect to the first latch member to a second locking position, thereby shifting the first opening away from the second opening to prevent an escape of said at least one latching projection from the second latch member.

A non-restrictive description of a preferred embodiment of the invention will now be given with reference to the appended drawings.

BRIEF DESCRIPTION OF THE DRAWINGS

FIG. 10 is a side semi-transparent view of the apparatus and the container shown in FIG. 9, after the latching member is rotated with respect to the first latch member by the initial apparatus pivot angle, thereby aligning the container with respect to the horizontal plane;

FIG. 11 is a side close-up view of the engagement between the latching projection and the second latching member shown in FIG. 10;

FIG. 12 is a side perspective view of the apparatus and the container shown in FIG. 11 after further rotation of the second latching member;

DESCRIPTION OF PREFERRED EMBODIMENTS

Figure 1:
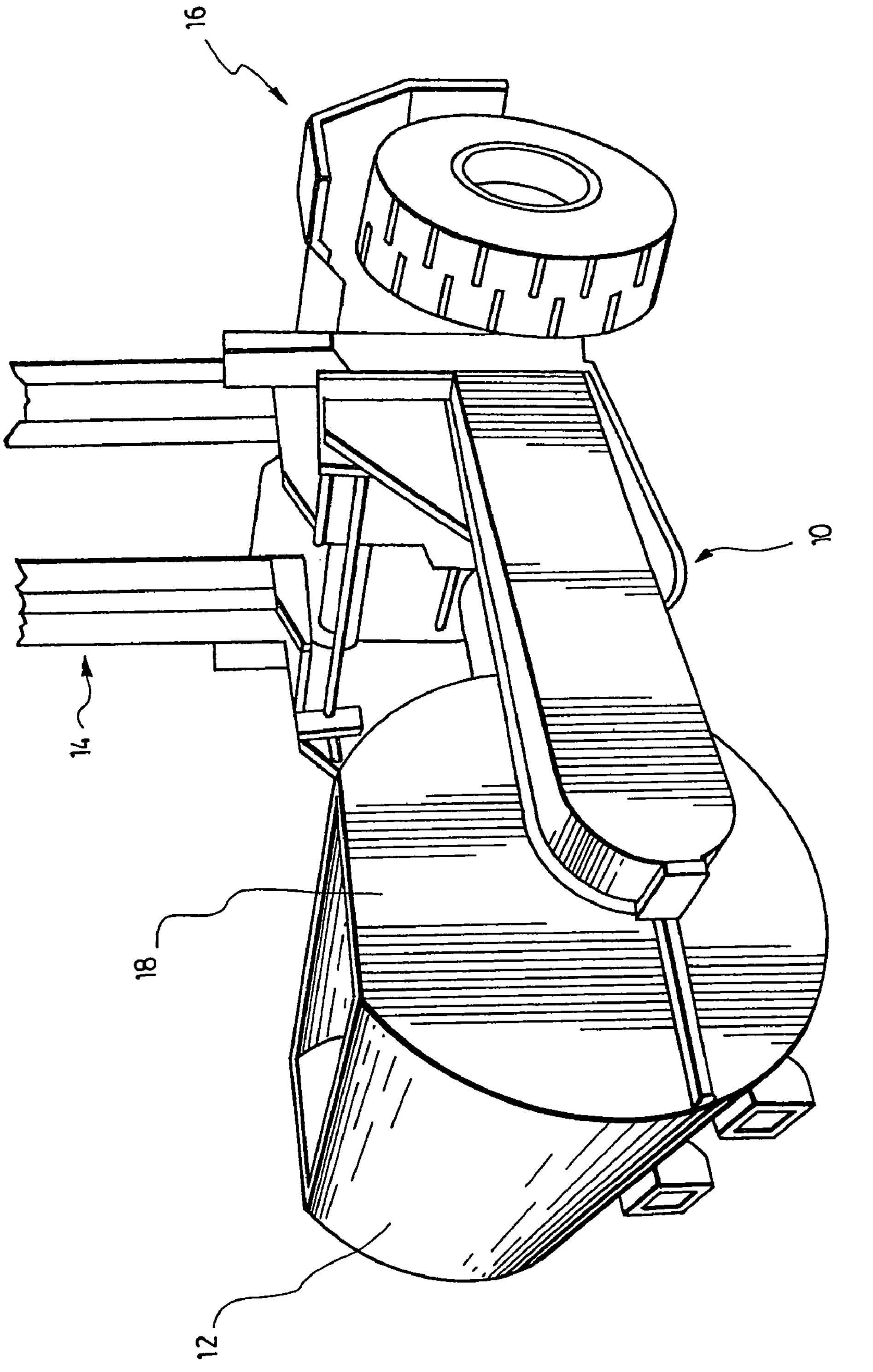
FIG. 1 is a perspective view of a transport vehicle provided with a container handling apparatus according to a preferred embodiment of the present invention, grasping a first type of container.
Figure 2:
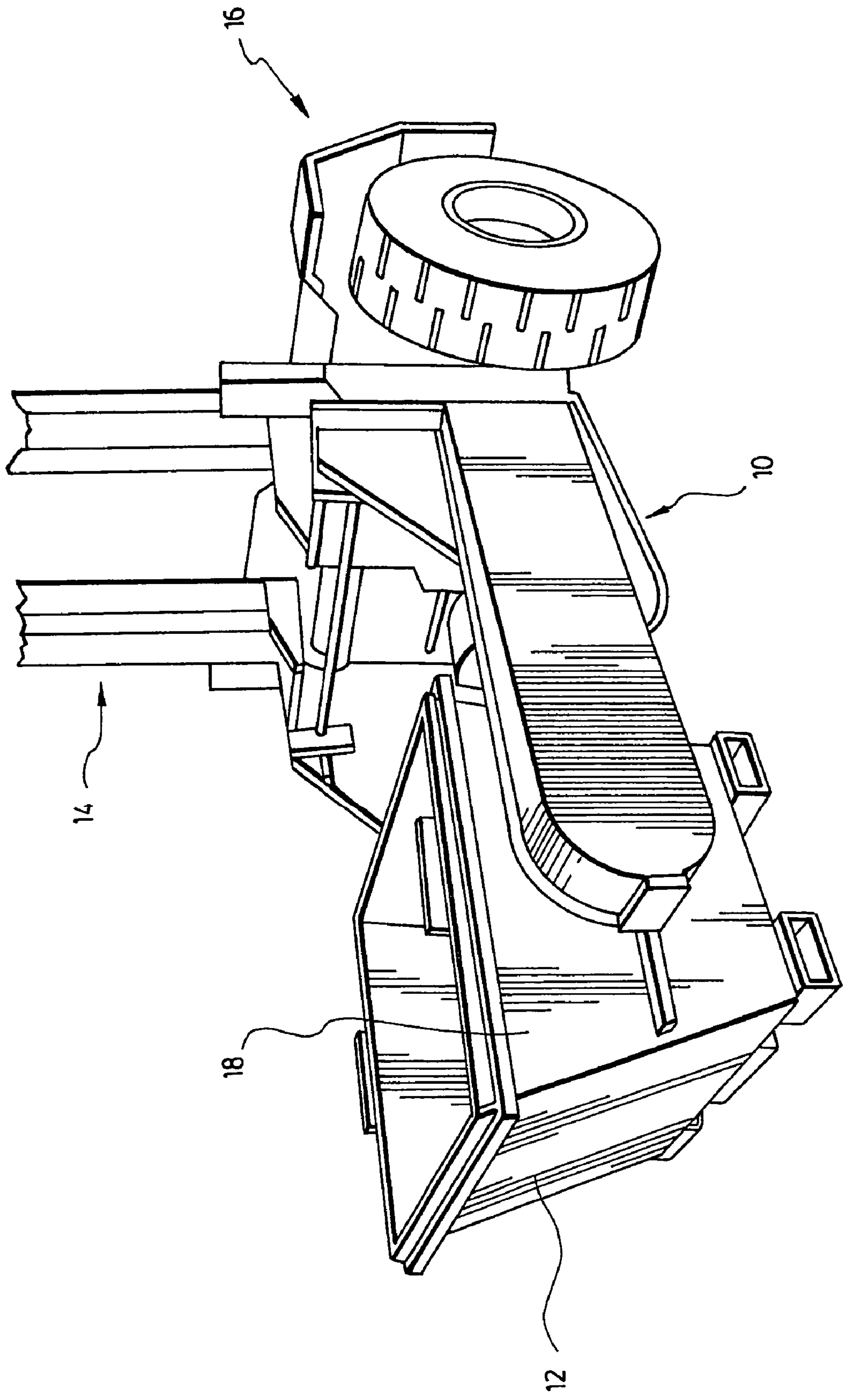
FIG. 2 is a perspective view of a transport vehicle provided with a container handling apparatus according to a preferred embodiment of the present invention, grasping a second type of container.
Figure 3:
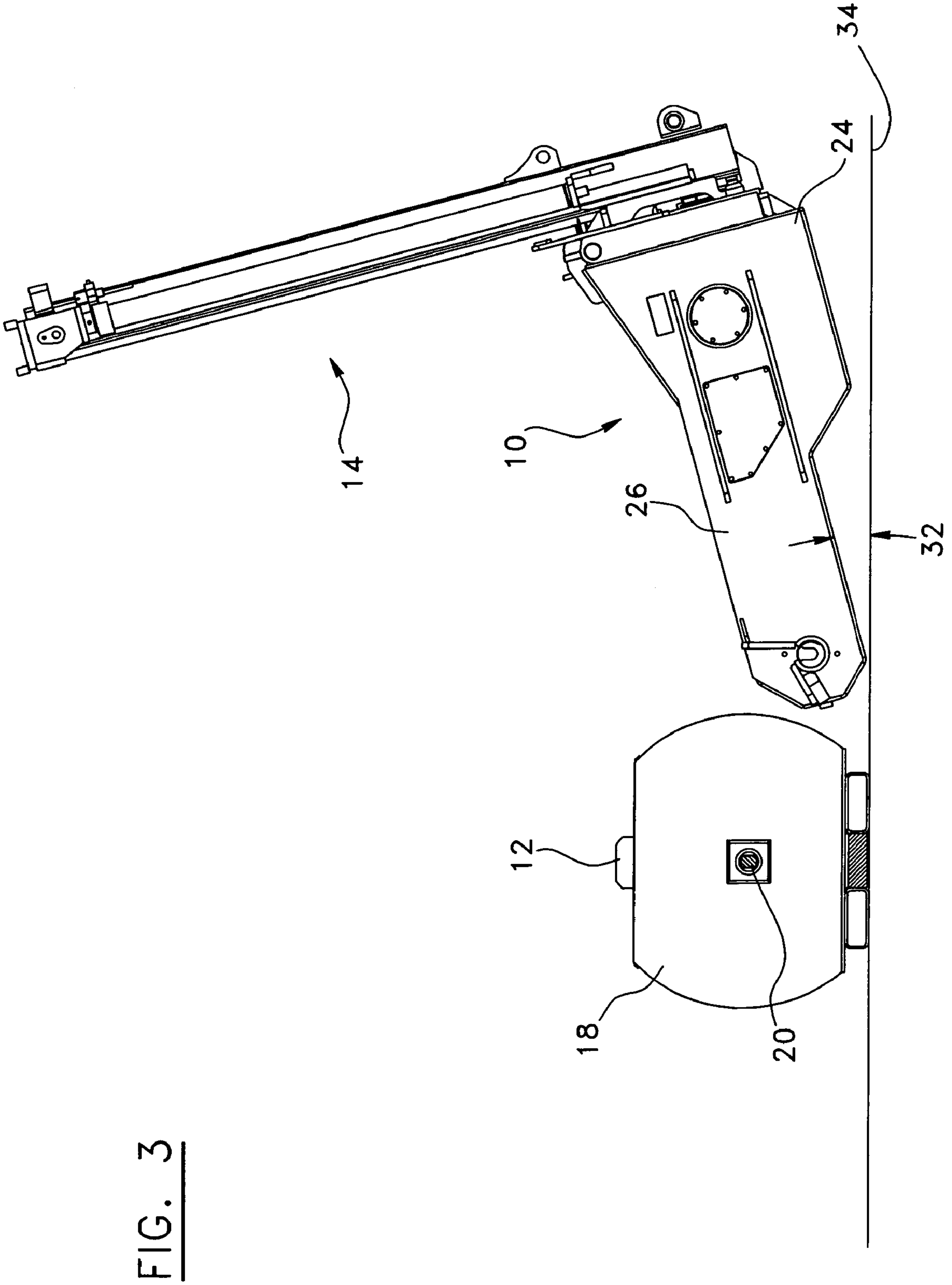
FIG. 3 is a side view of the container handling apparatus according to a preferred embodiment of the present invention, with the apparatus pivoted at a pivot angle with respect to the horizontal plane prior to advancing towards the container.

The apparatus 10 according to the preferred embodiments of the invention as shown in the drawings is intended to be used for handling a container 12. The apparatus 10 is operably attached to a lifting device 14 on a transport vehicle 16 that lifts and pivots the apparatus 10 with respect to a horizontal plane on which the container 12 rests. The container 12 comprises a pair of opposite sidewalls 18, the sidewalls 18 each having a latching projection 20 extending outwardly from a surface of the sidewall 18. At least one latching projection 20 has at least one flat contact surface 22.

Figure 4:
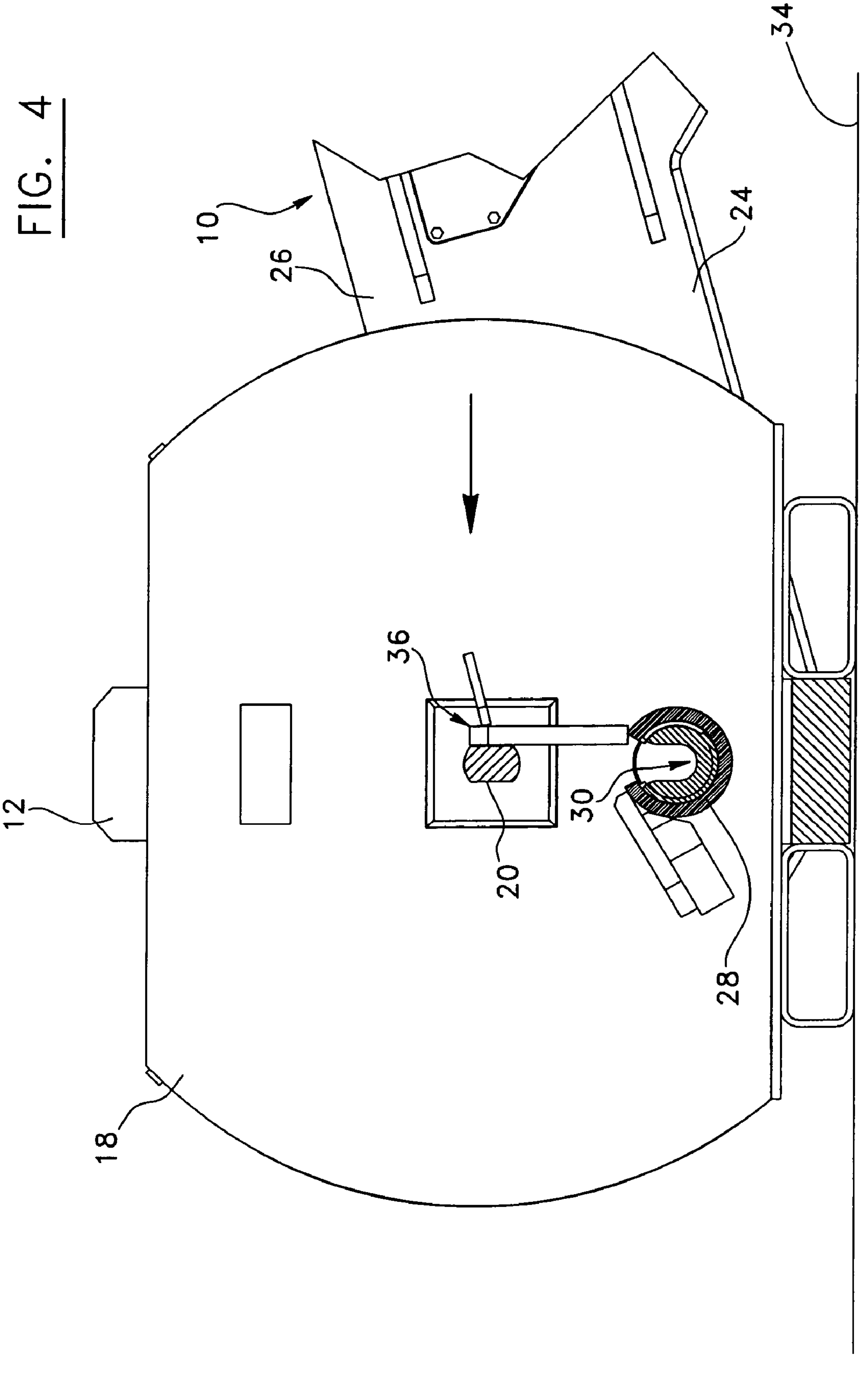
FIG. 4 is a side semi-transparent view of the apparatus shown in FIG. 3, showing the alignment guide entering into contact with the latching projection of the container.
Figure 5:
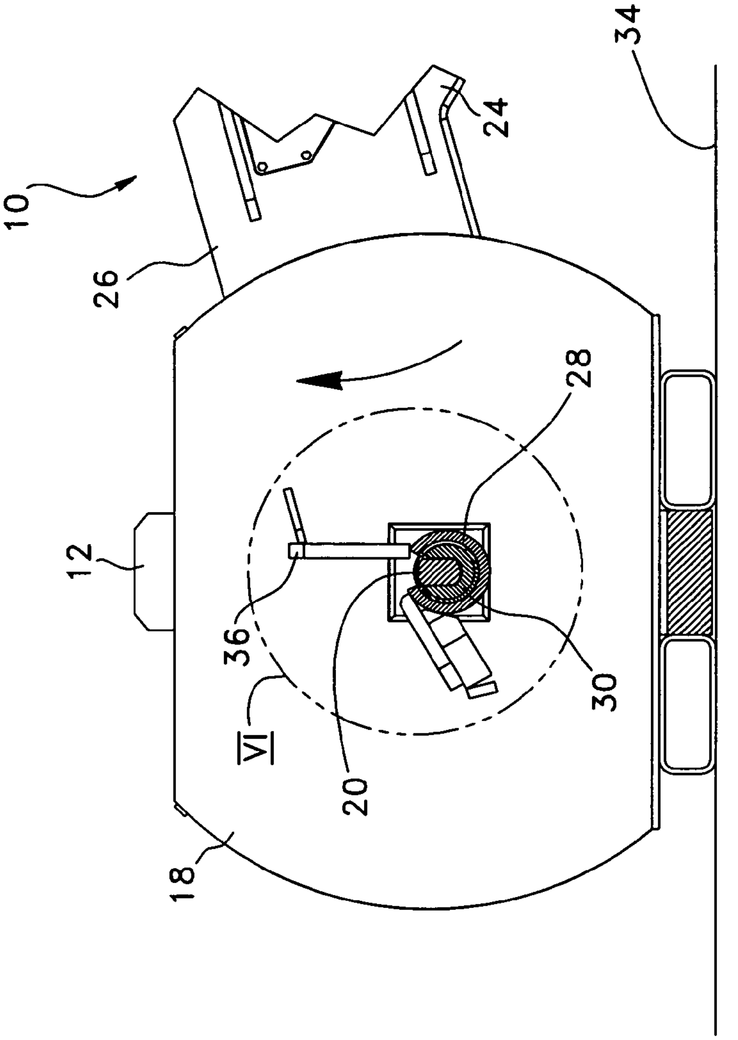
FIG. 5 is a side semi-transparent view of the apparatus shown in FIGS. 3 and 4, showing the apparatus being lifted with respect to the container and showing the engagement of the latching projection with the second latching member.
Figure 6:
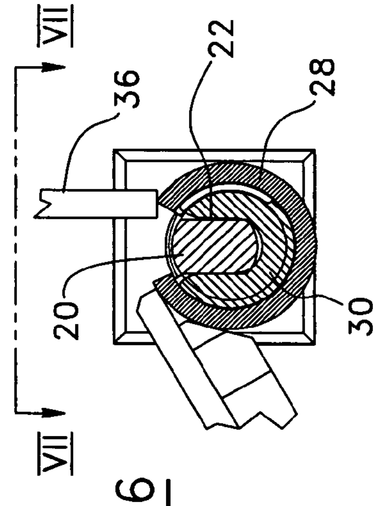
FIG. 6 is a side close-up view of the engagement between the latching projection and the second latching member shown in FIG. 5.
Figure 7:
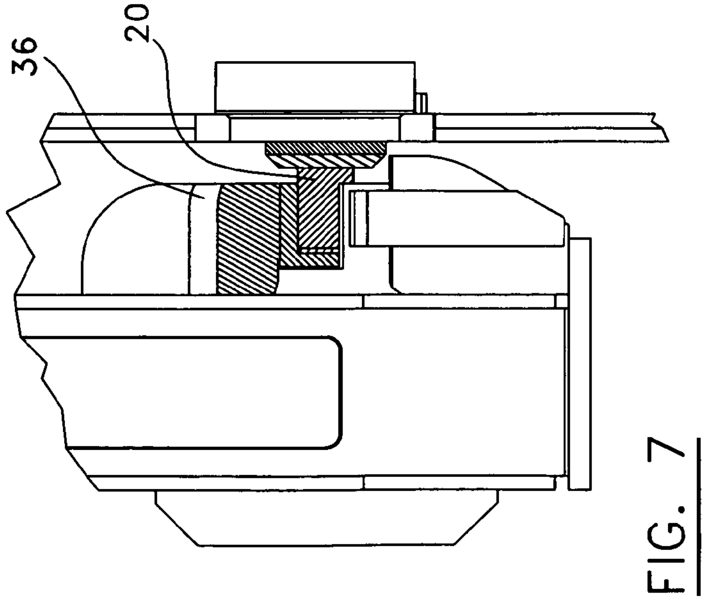
FIG. 7 is a top close-up view of the engagement between the latching projection and the second latching member shown in FIG. 5.
Figure 8:
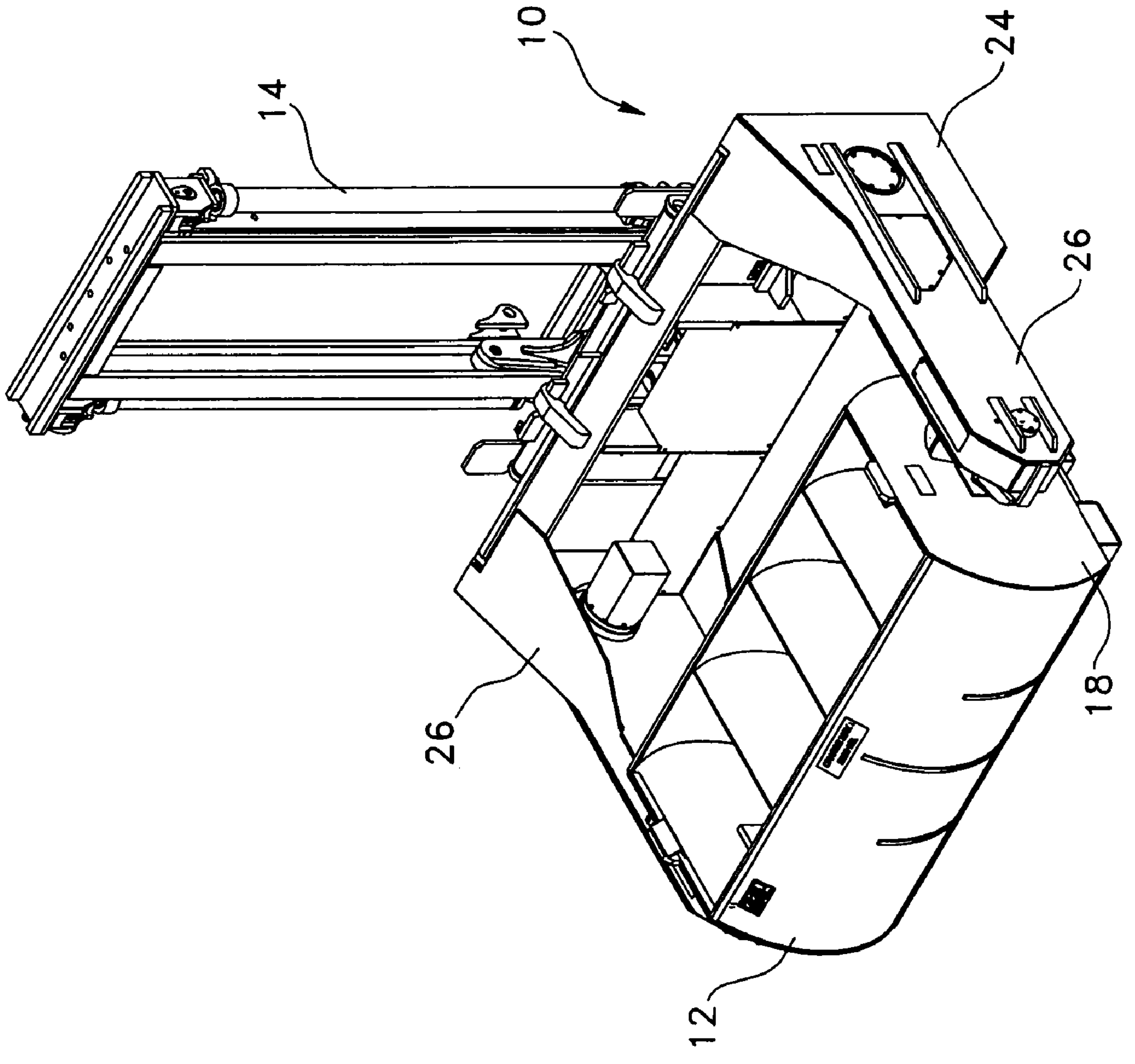
FIG. 8 is a side perspective view of the apparatus and the container shown in FIG. 5 after engagement of the latching projections with the second latching members.
Figure 9:
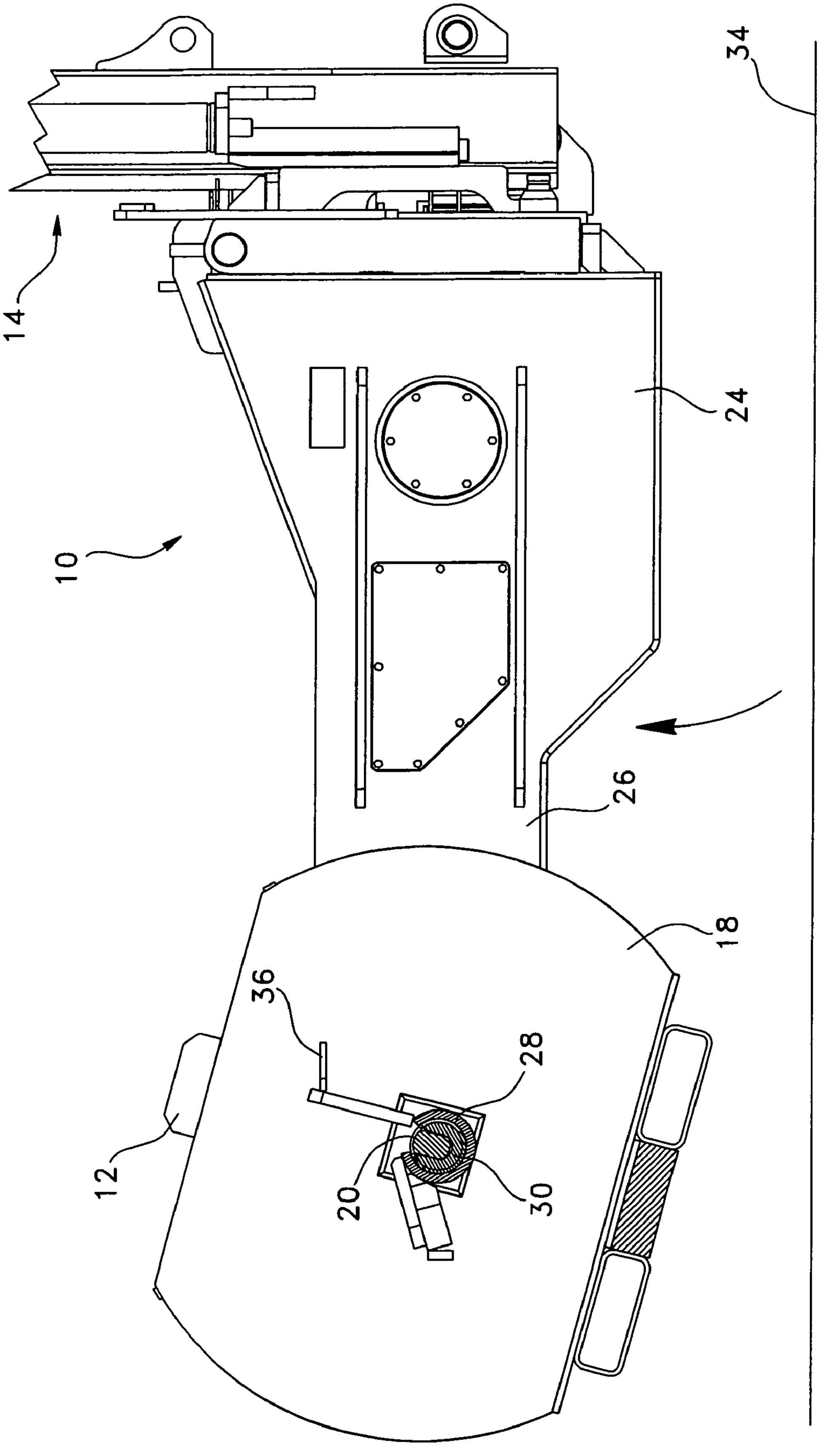
FIG. 9 is a side semi-transparent view of the apparatus and the container shown in FIG. 5, after the apparatus is realigned with respect to the horizontal plane.
Figure 14:
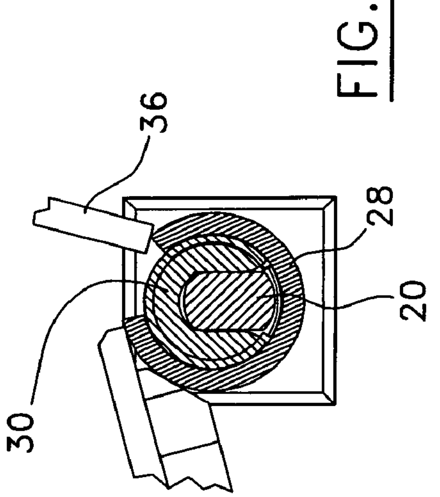
FIG. 14 is a side close-up view of the engagement between the latching projection and the second latching member shown in FIG. 13.

According to the present invention, the apparatus 10 comprises two arms 26. Preferably, the two arms extend from a base frame 24. The arms 26 are spaced apart and adapted to be advanced along and removably connected to the sidewalls 18 of the container 12. As shown in FIG. 4, at least one arm 26 comprises a first generally C-shaped latch member 28 having a first opening sized to allow a passage of one of the latching projections 20 therethrough. The at least one arm 26 also comprises a second generally C-shaped latch member 30 rotatably nested inside the first latch member 28. The second latch member 30 has a second opening sized to allow the passage of the latching projection 20 therethrough and has an inner contact surface shaped to receive the latching projection 20.

The at least one arm further comprises rotating means to selectively rotate the second latch member 30 with respect to the corresponding first latch member 28 between different positions. Among these positions, as shown in FIGS. 4 to 9, there is a first capture position in which the first and second openings of the first 28 and second 30 latch members are aligned to allow an engagement of the latching projection 20 of the container 12 with the second latch member 30 as a result of a lifting of the apparatus 10. Among the above-mentioned positions, as shown in FIGS. 10 to 15, there is also at least one locking position in which the second latch member 30 is rotated with respect to the first latch member 28, thereby shifting the first opening away from the second opening and preventing an escape of the latching projection 20 from the second latch member 30.

Preferably, the at least one arm 26 further comprises an alignment guide 36 to direct motion of the latching projection 20 towards the second latching member 30 after an advance and a contact of the apparatus 10 against the container 12.

Figure 16:
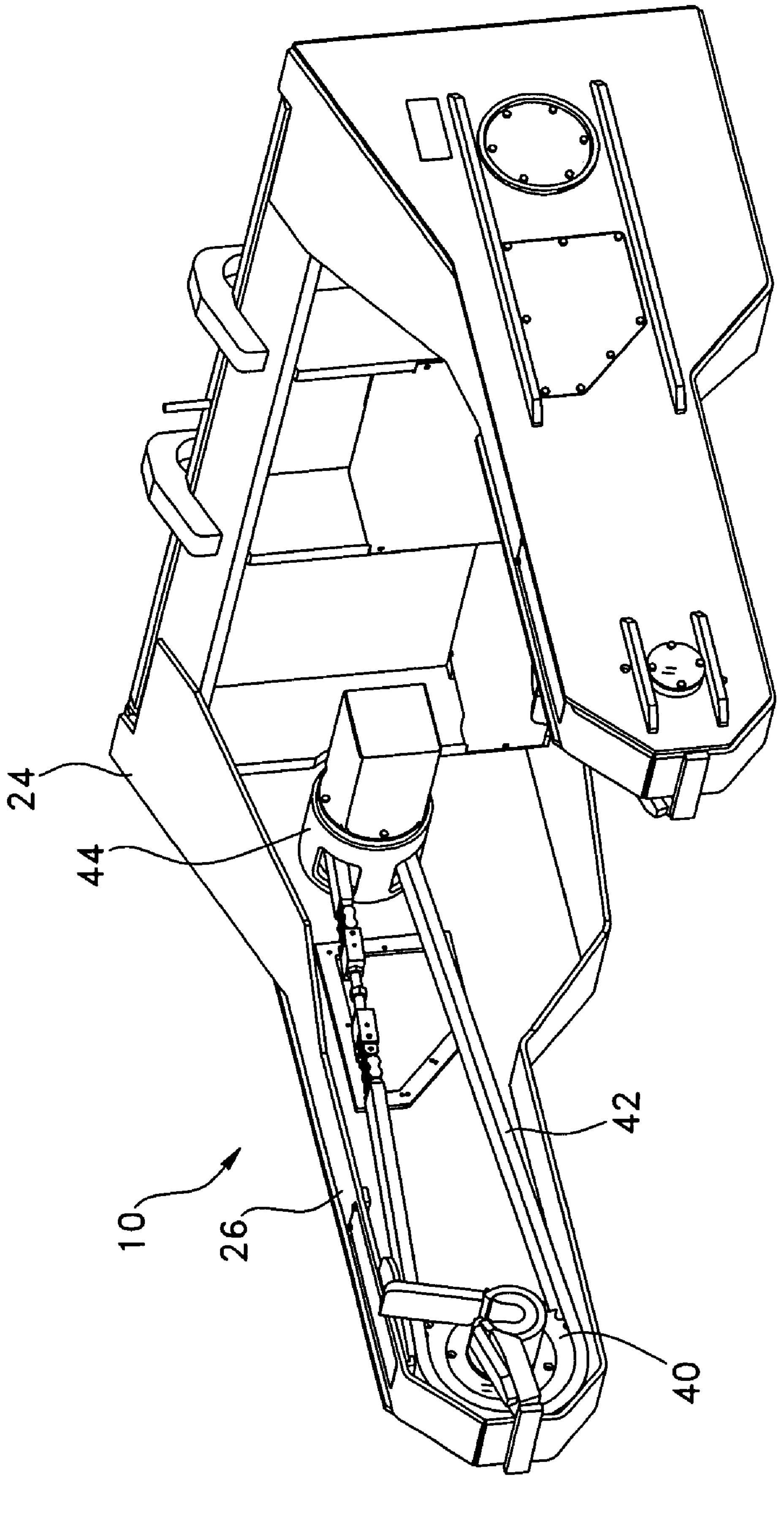
FIG. 16 is a perspective semi-transparent view of an arm of the apparatus according to a preferred embodiment of the present invention, illustrating the components of the rotations means when the second latching member is in the capture position.
Figure 17:
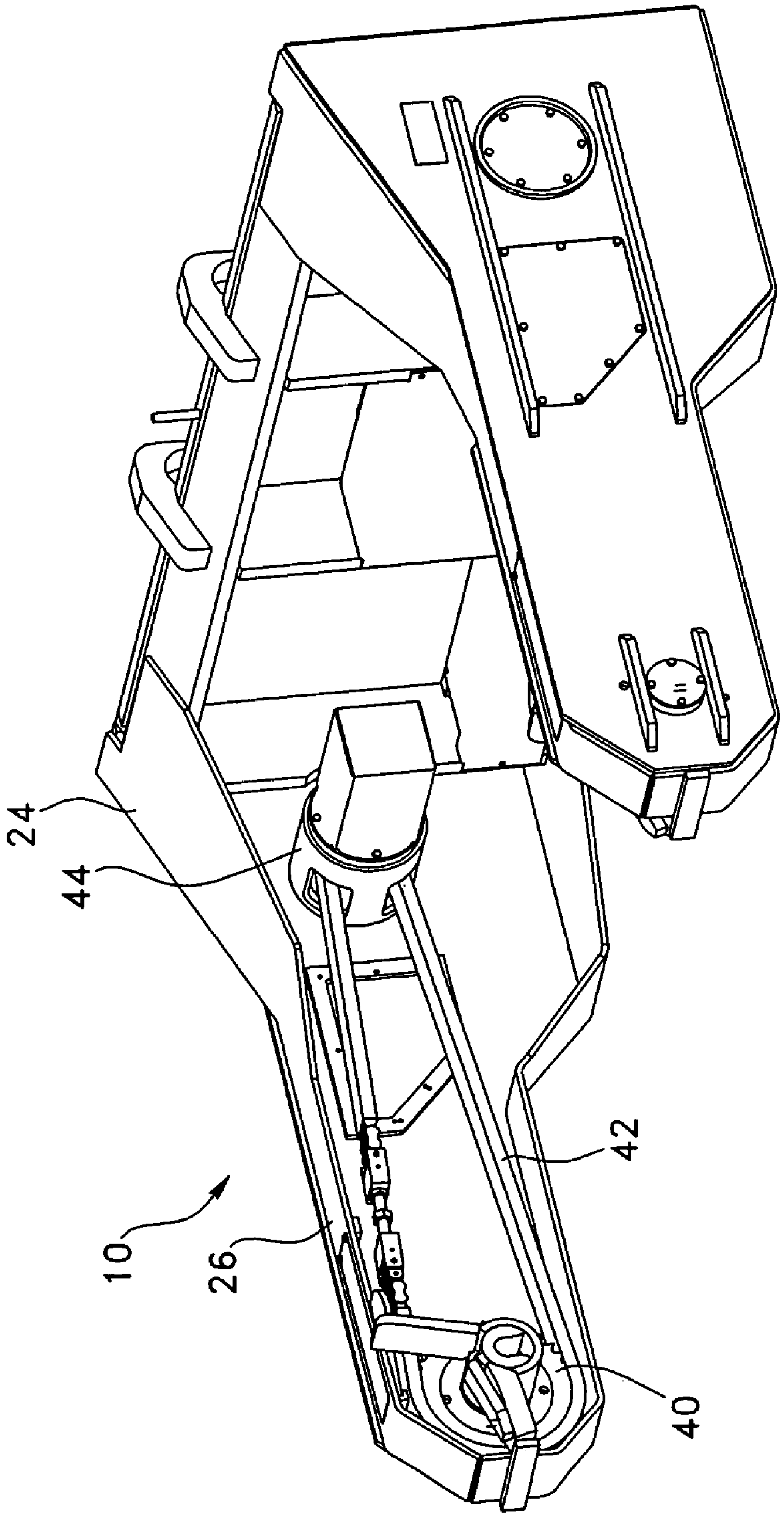
FIG. 17 is a perspective semi-transparent view of an arm of the apparatus according to a preferred embodiment of the present invention, illustrating the components of the rotations means when the second latching member is in the dumping position.
Figure 18A:
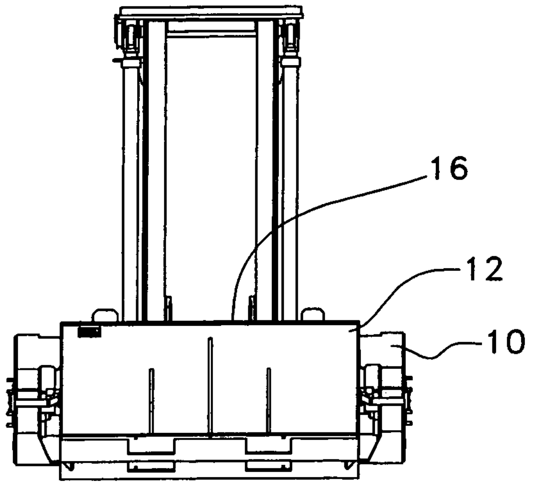
FIGS. 18*a* to 18*c* are a front view of the of a transport vehicle provided with a container handling apparatus according to another preferred embodiment of the present invention, illustrating a range of motion in the rotation of the container between the capture position and the dumping position.
Figure 18B:
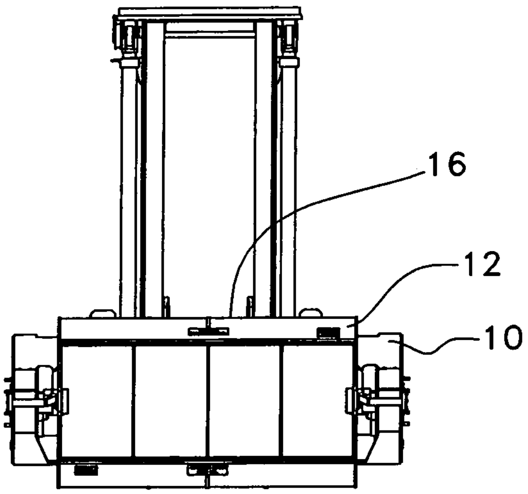
Figure 18C:
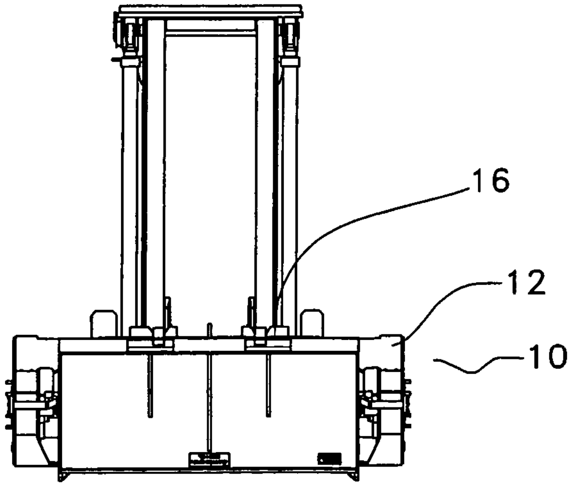

As shown in FIGS. 16 and 17, the rotating means preferably comprises a toothed gear 40 actuated by a transmission chain 42 driven by a hydraulic motor 44.

Preferably, the first opening of each of the first latch members 28 is positioned with an offset angle with respect to a direction perpendicular to the horizontal plane 34 such that the apparatus 10 is pivoted at a pivot angle 32 equal to the offset angle with respect to the horizontal plane 34 during the engagement of said at least one latching projection 20 with the corresponding second latch member 30.

Preferably, the at least one locking position includes, among others, a leveling position shown in FIG. 10 in which the second latch member 30 is rotated with respect to the first latch member 28 by the pivot angle 32, thereby aligning the container 12 with the horizontal plane 34 when the apparatus 10 is in alignment with the horizontal plane 34. Preferably, the at least one locking position also includes a dumping position, shown in FIGS. 13 to 15, in which the second latch member 30 is rotated with respect to the first latch member 28 by a dumping angle with respect to the leveling position.

For the preferred embodiments illustrated in FIGS. 1-18, the pivot angle is preferably 15 degrees and the dumping angle is 180 degrees from the leveling position.

Preferably, the latching projection 20 extending outwardly from the surface of the sidewall 18 extends along a central axis of the container.

Preferably, the types of containers being manipulated by the apparatus are silica boxes, dumping boxes or skimming tubs.

As disclosed hereinabove in the Summary of the Invention, the present invention also teaches a method of handling a container with a lifting device on a transport vehicle. The method involves basic steps to which may be added a plurality of optional steps.

More specifically, a method of handling a container 12 with a lifting device 14 on a transport vehicle 16 according to the present invention comprises the steps of:

a) providing the container 12 comprising a pair of opposite sidewalls 18, the sidewalls 18 each having a latching projection 20 extending outwardly from a surface of the sidewall 18, at least one latching projection 20 having at least one flat contact surface;

b) providing an apparatus 10 operably attached to the lifting device 14, the apparatus 10 comprising:

two arms, said arms being spaced apart and adapted to be advanced along and removably connected to the sidewalls of the container, at least one arm 26 being adjacent to the sidewall having said at least one of said latching projections and comprising:

a first generally C-shaped latch member 28 having a first opening sized to allow a passage of said at least one latching projection 20 of the container 12 therethrough;

a second generally C-shaped latch member 30 rotatably nested inside the first latch member 28, the second latch member 30 having a second opening sized to allow the passage of said at least one latching projection therethrough and having an inner contact surface shaped to receive said at least one latching projection 20; and rotating means to selectively rotate the second latch member 30 with respect to the corresponding first latch member 28;

c) rotating the second latch member 30 with respect to the first latch member 28 to a first capture position in which the first and second openings of the first 28 and second 30 latch members are aligned;

d) positioning and lifting the apparatus 10 against the container 12 thereby allowing an engagement of said at least one latching projection 20 with the second latch member 30;

e) lifting the container 12 off a horizontal plane 34 on which the container 12 rests; and f) rotating the second latch member 30 with respect to the first latch member 28 to a second locking position, thereby shifting the first opening away from the second opening to prevent an escape of said at least one latching projection 20 from the second latch member 30.

Figure 13:
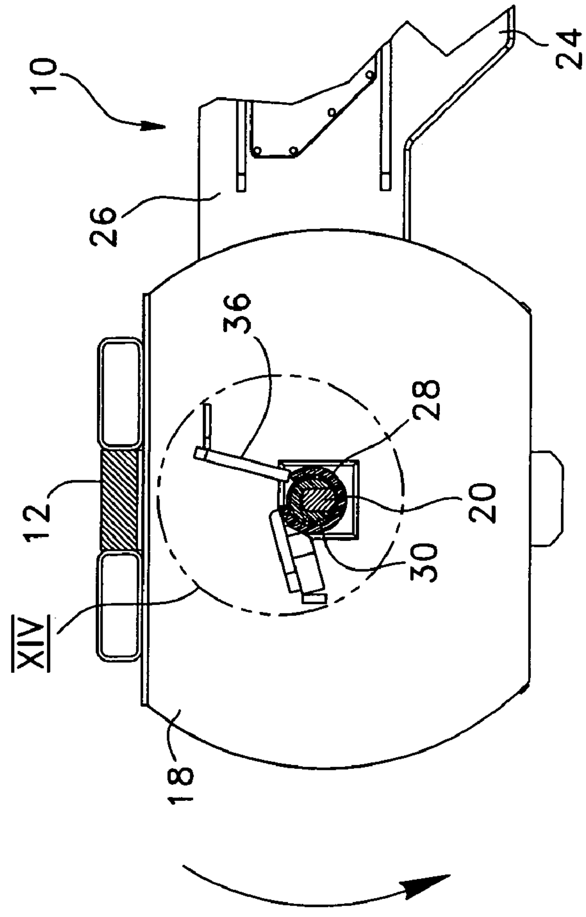
FIG. 13 is a side semi-transparent view of the apparatus and the container shown in FIG. 10, after the latching member is rotated with respect to the first latch member to a dumping position.
Figure 15:
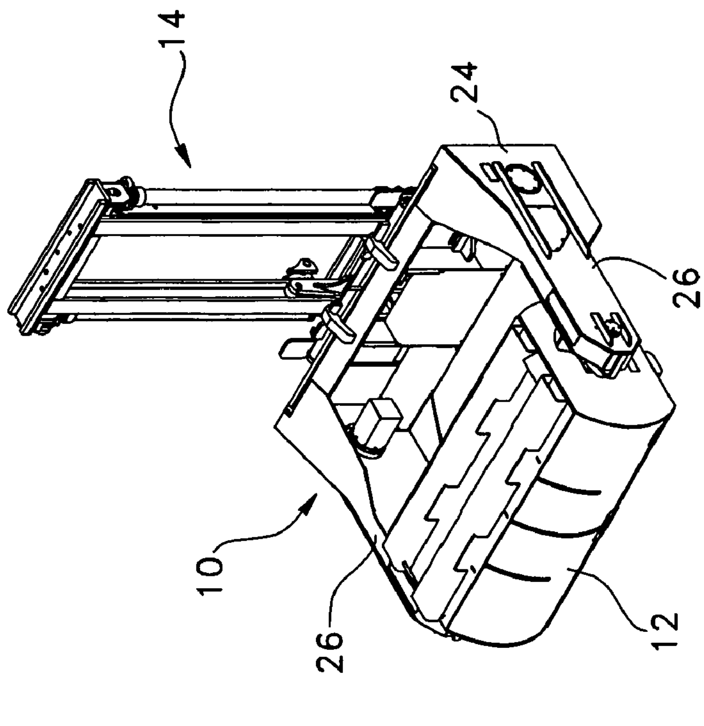
FIG. 15 is a side perspective view of the apparatus and the container shown in FIG. 13 with the container in a dumping position.

Preferably, the first opening of each of the first latch members 28 is positioned with an offset angle with respect to a direction perpendicular to the horizontal plane 34 such that the apparatus 10 is pivoted at a pivot angle 32 equal to the offset angle with respect to the horizontal plane 34 during the engagement of the latching projection 20 with the corresponding second latch member 30, and the method further comprises the steps of:

rotating the second latch member 30 with respect to the first latch member 28 to a leveling position to align the container 12 with the horizontal plane 34 when the apparatus 10 is in alignment with the horizontal plane 34 as shown in FIG. 10; and rotating the second latch member 30 with respect to the first latch member 28 to a dumping position by a dumping angle with respect to the leveling position as shown in FIG. 13.

Preferably, both of said latching projections have at least one flat contact surface and both of said arms comprise said first latch member, said second latch member and said rotating means. Consequently, both arms comprise the latching mechanism required to actively rotate the container. Alternate embodiments of the present invention include an apparatus having only one arm with the latching mechanism, and the other arm having passive means that nevertheless allow engagement and rotation of the container by the active arm.

Preferably, rotation of the container 12 is executed by hydraulic motors or any other system if possible, including pistons. The grasping system with a funnel oriented towards the bottom, as well as the movement which forces the operator to lift the container 12 by an angle of 15°, are very important. This movement serves to keep the container 12 from coming out of the grasp of the apparatus 10 when approaching the oven. The container is typically rotated towards the front of the vehicle.

The apparatus 10 according to the present invention interacts with the container 12, which has a high content capacity and is at the same time extremely resistant to harsh environments. Since the dumping sequence is done easily, the structure of the container 12 is designed not only as a function of the apparatus 10, but also as a function of its contents (billets) which must be dumped with as few problems as possible. Hence, the containers 12 are designed to be stacked one on top of the other and can be moved from one place to another with a typical power lift truck. Consequently, the containers 12 have a balanced structure and are easily stacked and easy to handle.

Preferably, the pivoting mechanism of the apparatus according to the present invention allows the container 12 to rotate about a central axis so that the apparatus 10 can dump the contents of the container 12 without having components of the apparatus 10 or container 12 entering contact with the molten aluminum metal. The apparatus 10 according to the present invention comprises pistons that actuate to adjustable arms (that have travel ranging between 62 and 82 inches, which allows also the dumping of silica buckets). Consequently, rotation is preferably accomplished with two hydraulic motors with gearing chains and stiffeners as shown in FIGS. 16 and 17. The grappling system resembles a funnel on top of the container. A tightening movement of the arms allowed an oval shaped plaque to engage the container.

The apparatus 10 according to the present invention has the advantage of enabling the loading of ovens or other systems without risk to the operator. The apparatus 10 also allows a decrease in the loading or transfer time of containers. The apparatus 10 also helps maintain in a positive manner the container to be displaced and dumped.

The principle behind the development of the apparatus 10 according to the present invention ensures that the container 12 is well grasped and cannot be dropped when placed over hot molten metal. The apparatus could be used for other applications that require grasping of various containers.

The apparatus 10 according to the present invention can be used to feed elements into ovens but could also be used for several other different applications. The apparatus allows direct loading into ovens of scrap billets, silica or any other required material. This apparatus can be used for other applications.

Although the present invention has been explained hereinabove by way of preferred embodiments thereof, it should be pointed out that any modifications to these preferred embodiments within the scope of the appended claims is not deemed to alter or change the nature and scope of the present invention. For example, as mentioned above, both latching projections preferably have at least one flat contact surface and both arms preferably comprise the latching mechanism required to actively rotate the container. However, the apparatus could have only one arm with the above-described active latching mechanism, while the other arm would have passive means that nevertheless would allow engagement and rotation of the container by the active arm. Similarly, the alignment guides required to direct the motion of the latching projection of the adjacent sidewall towards the second latching member after an advance of the arms of the apparatus along the sidewalls of the container could be on located on either or both arms.

What is claimed is:

1. An apparatus for handling a container, said apparatus being operably attached to a lifting device on a transport vehicle that lifts and pivots the apparatus with respect to a horizontal plane on which the container rests, the container comprising a pair of opposite sidewalls, said sidewalls each having a latching projection extending outwardly from it, at least one of said latching projections having at least one flat contact surface, wherein said apparatus comprises:

a) two arms, said arms being spaced apart and adapted to be advanced along and removably connected to the sidewalls of the container, at least one arm being adjacent to the sidewall having said at least one of said latching projections and comprising:

ii) a first generally C-shaped latch member having a first opening sized to allow a passage of said at least one latching projection of the container therethrough;

ii) a second generally C-shaped latch member rotatably nested inside the first latch member, said second latch member having a second opening sized to allow the passage of said at least one latching projection therethrough and having an inner contact surface shaped to receive said at least one latching projection; and iii) rotating means to selectively rotate said second latch member with respect to the corresponding first latch member between:

A) a first capture position in which the first and second openings of the first and second latch members are aligned to allow an engagement of said at least one latching projection of the container with the second latch member as a result of a lifting of the apparatus; and B) at least one locking position in which the second latch member is rotated with respect to the first latch member, thereby shifting the first opening away from the second opening to prevent an escape of said at least one latching projection from the second latch member, and wherein the first opening of each of the first latch members is positioned with an offset angle with respect to a direction perpendicular to the horizontal plane such that the apparatus is pivoted at a pivot angle equal to the offset angle with respect to the horizontal plane during the engagement of said at least one latching projection with the corresponding second latch member.

2. The apparatus according to claim 1, wherein said at least one arm further comprises an alignment guide to direct motion of the latching projection of the adjacent sidewall towards the second latching member after an advance of the arms of the apparatus along the sidewalls of the container.

3. The apparatus according to claim 2, wherein the rotating means comprise a toothed gear actuated by a transmission chain driven by a hydraulic motor.

4. The apparatus according to claim 1, wherein both of said latching projections have at least one flat contact surface and both of said arms comprise the first latch member, the second latch member and the rotating means as defined in claim 1.

5. The apparatus according to claim 1, wherein the at least one locking position includes:

a) leveling position in which the second latch member is rotated with respect to the first latch member by the pivot angle, thereby aligning the container with the horizontal plane when the apparatus is in alignment with the horizontal plane; and b) a dumping position in which the second latch member is rotated with respect to the first latch member by a dumping angle with respect to the leveling position.

6. The apparatus according to claim 5, wherein the dumping angle is 180 degrees.

7. The apparatus according to claim 1, wherein the pivot angle is 15 degrees.

8. The apparatus according to claim 1, wherein the latching projection extending outwardly from the surface of the sidewall extends along a central axis of the container.

9. The apparatus according to claim 1, wherein the at least one locking position includes:

a) leveling position in which the second latch member is rotated with respect to the first latch member by the pivot angle, thereby aligning the container with the horizontal plane when the apparatus is in alignment with the horizontal plane; and b) a dumping position in which the second latch member is rotated with respect to the first latch member by a dumping angle with respect to the leveling position.

10. The apparatus as claimed in claim 9, wherein the latching projection extending outwardly from the surface of the sidewall extends along a central axis of the container.

11. The apparatus according to claim 10, wherein the container is selected from a group consisting of silica boxes, dumping boxes and skimming tubs.

12. A method of handling a container with a lifting device on a transport vehicle comprising the steps of:

a) providing the container comprising a pair of opposite sidewalls, said sidewalls each having a latching projection extending outwardly from it, at least one of said latching projections having at least one flat contact surface;

b) providing an apparatus operably attached to the lifting device, the apparatus comprising:

i) two arms, said arms being spaced apart and adapted to be advanced along and removably connected to the sidewalls of the container, at least one arm being adjacent to the sidewall having the at least one of said latching projections and comprising:

A) a first generally C-shaped latch member having a first opening sized to allow a passage of said at least one latching projection of the container therethrough;

B) a second generally C-shaped latch member rotatably nested inside the first latch member, said second latch member having a second opening sized to allow the passage of said at least one latching projection therethrough and having an inner contact surface shaped to receive said at least one latching projection; and C) rotating means to selectively rotate said second latch member with respect to the corresponding first latch member;

c) rotating the second latch member with respect to the first latch member to a first capture position in which the first and second openings of the first and second latch members are aligned;

d) positioning and lifting the apparatus against the container thereby allowing an engagement of said at least one latching projection with the second latch member;

e) lifting the container off a horizontal plane on which the container rests; and f) rotating the second latch member with respect to the first latch member to a second locking position, thereby shifting the first opening away from the second opening to prevent an escape of said at least one latching projection from the second latch member, wherein the first opening of each of the first latch members is positioned with an offset angle with respect to a direction perpendicular to the horizontal plane such that the apparatus is pivoted at a pivot angle equal to the offset angle with respect to the horizontal plane during the engagement of said at least one latching projection with the corresponding second latch member.

13. The method according to claim 12, the method further comprising the steps of:

rotating the second latch member with respect to the first latch member to a leveling position to align the container with the horizontal plane when the apparatus is in alignment with the horizontal plane; and rotating the second latch member with respect to the first latch member to a dumping position by a dumping angle with respect to the leveling position.

14. The method according to claim 13, wherein both of said latching projections have at least one flat contact surface and both of said arms comprise a first latch member, a second latch member and a rotating means as defined in claim 13.

15. The method according to claim 13, wherein the pivot angle is 15 degrees and the dumping angle is 180 degrees.

16. The method according to claim 12, wherein said at least one arm further comprises an alignment guide to direct motion of the latching projection of the adjacent sidewall towards the second latching member after an advance of the arms of the apparatus along the sidewalls of the container.

17. The method according to claim 12, wherein the rotating means comprise a toothed gear actuated by a transmission chain driven by a hydraulic motor.

18. The method according to claim 12, wherein the latching projection extending outwardly from the surface of the sidewall extends along a central axis of the container.

* * * * *